United States Patent
Kim

(10) Patent No.: US 11,007,999 B2
(45) Date of Patent: May 18, 2021

(54) AUTOMATIC PARKING CONTROL APPARATUS AND METHOD THEREOF

(71) Applicants: HYUNDAI MOTOR COMPANY, Seoul (KR); KIA MOTORS CORPORATION, Seoul (KR)

(72) Inventor: Gyung Cho Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/930,691

(22) Filed: May 13, 2020

(65) Prior Publication Data
US 2021/0070282 A1 Mar. 11, 2021

(30) Foreign Application Priority Data
Sep. 9, 2019 (KR) .......................... 10-2019-0111714

(51) Int. Cl.
| | |
|---|---|
| *B60W 30/06* | (2006.01) |
| *B60W 40/08* | (2012.01) |
| *B60Q 9/00* | (2006.01) |
| *G06K 9/00* | (2006.01) |

(52) U.S. Cl.
CPC ............ *B60W 30/06* (2013.01); *B60Q 9/006* (2013.01); *B60W 40/08* (2013.01); *G06K 9/00805* (2013.01); *G06K 9/00812* (2013.01); *B60W 2040/0881* (2013.01); *B60W 2540/047* (2020.02)

(58) Field of Classification Search
None
See application file for complete search history.

(56) References Cited

U.S. PATENT DOCUMENTS

| | | | |
|---|---|---|---|
| 9,796,381 B2 | 10/2017 | Jung et al. | |
| 10,807,641 B2 * | 10/2020 | Gehin | ................... G08G 1/168 |
| 2014/0268711 A1 * | 9/2014 | Lee | ........................... F21L 4/02 |
| | | | 362/191 |
| 2016/0311429 A1 * | 10/2016 | Holland-Letz | ........ B60W 40/02 |
| 2017/0101090 A1 | 4/2017 | Jung et al. | |

(Continued)

FOREIGN PATENT DOCUMENTS

| | | | | |
|---|---|---|---|---|
| DE | 112015007069 T5 * | 7/2018 | ............. | H04N 7/183 |
| EP | 3124995 A1 * | 2/2017 | ............. | G01S 15/86 |

(Continued)

*Primary Examiner* — Fekadeselassie Girma
(74) *Attorney, Agent, or Firm* — Brinks Gilson & Lione

(57) ABSTRACT

An automatic parking control apparatus may recommend an occupant of a host vehicle to exit the host vehicle before the host vehicle complete an automatic parking based on an amount of space for exiting the host vehicle during the automatic parking to resolve inconvenience of the occupant when exiting the host vehicle, thereby improving the commercial value of an automatic parking system mounted on the host vehicle. The automatic parking control apparatus includes: a first sensor that measures a distance from an obstacle to the host vehicle, and a controller that searches for a target parking space based on data on the distance measured by the first sensor and recommend the occupant of the host vehicle exit the host vehicle based on an amount of space for exiting the host vehicle when the host vehicle is parked in the target parking space.

18 Claims, 10 Drawing Sheets

(56) References Cited

U.S. PATENT DOCUMENTS

| | | | | |
|---|---|---|---|---|
| 2017/0313247 | A1* | 11/2017 | Hsu | G06T 7/70 |
| 2018/0029591 | A1* | 2/2018 | Lavoie | G06N 7/005 |
| 2018/0118100 | A1* | 5/2018 | Kjaer-Lohse | B62D 15/027 |
| 2018/0354502 | A1* | 12/2018 | Yaldo | H04W 4/46 |
| 2019/0225211 | A1* | 7/2019 | Hause | G06K 9/00825 |
| 2020/0018602 | A1* | 1/2020 | Beaurepaire | G08G 1/096866 |
| 2020/0086852 | A1* | 3/2020 | Krekel | B60W 50/14 |
| 2020/0298835 | A1* | 9/2020 | Suzuki | G05D 1/0044 |

FOREIGN PATENT DOCUMENTS

| | | | | |
|---|---|---|---|---|
| EP | 3239945 A1 * | 11/2017 | | G06T 7/521 |
| KR | 10-2017-0043361 A | 4/2017 | | |
| KR | 10-1927156 B1 | 12/2018 | | |

* cited by examiner

AUTOMATIC PARKING CONTROL APPARATUS AND METHOD THEREOF

CROSS-REFERENCE TO RELATED APPLICATION

This application claims priority to and the benefit of Korean Patent Application No. 10-2019-0111714, filed on Sep. 9, 2019, the entire contents of which are incorporated herein by reference.

FIELD

The present disclosure relates to a technique for inducing the alighting of an occupant before the automatic parking is completed in consideration of the alighting space of the occupant during the automatic parking of a vehicle.

BACKGROUND

The statements in this section merely provide background information related to the present disclosure and may not constitute prior art.

In general, when the driver selects a parking mode and a direction to a target parking space, Automatic Parking Assist System generates a parking trajectory for parking the vehicle in the target parking space. The vehicle is parked by following the generated parking trajectory.

This automatic parking system recognizes the target parking space through the ultrasonic sensor disposed in the front/rear/left/right of the vehicle and performs the parking by automatically performing acceleration, braking, shifting, steering and the like.

Unlike the parking steering assistance system that controls only the steering to assist the parking to the target parking space and the driver performs acceleration, deceleration and shift, the automatic parking system including electric stability control (ESC) and shift by wire (SBW) may directly perform the vehicle speed and shift control.

Therefore, the driver may instruct the automatic parking using the button inside the vehicle, or may direct the automatic parking using the smart key in the state of getting off.

Because the conventional automatic parking system performs automatic parking without considering a space for the occupant (driver, occupant) to exit the host vehicle when the vehicle is parked in a parking space, when the vehicle is parked in a narrow parking space it is inconvenient for the occupant when exiting the vehicle.

The matters described in this background section are intended to promote an understanding of the background of the disclosure and may include matters that are not already known to those of ordinary skill in in the art.

SUMMARY

The present disclosure has been made to solve the above-mentioned problems occurring in the prior art while advantages achieved by the prior art are maintained intact.

An aspect of the present disclosure provides an automatic parking control apparatus for a vehicle and a method thereof, which can recommend an occupant to exit the vehicle before the automatic parking is completed based on an amount of space for exiting the vehicle during the automatic parking of the vehicle to resolve inconvenience of the occupant when exiting from the vehicle, thereby improving the commercial value of an automatic parking system mounted on a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an automatic parking control apparatus includes: a first sensor that measures a distance from obstacle to a host vehicle, and a controller that searches for a target parking space based on data on the distance measured by the first sensor and determine whether to recommend that an occupant of the host vehicle exit the host vehicle based on an amount of space for exiting the host vehicle when the host vehicle is parked in the target parking space.

The controller may recommend the occupant exit the host vehicle when a width of the space for exiting the host vehicle in the target parking space does not exceed a reference value during an automatic perpendicular parking control.

When a passenger seat of the host vehicle is occupied, the controller may stop the host vehicle at a first reference location at which a passenger side door of the host vehicle does not touch a previously parked vehicle even when the passenger side door is opened. The controller may not stop the host vehicle at the first reference location when another vehicle approaching the host vehicle is detected. The first reference location may include a location closest to a location where the automatic perpendicular parking control of the host vehicle is completed.

When a rear seat of the host vehicle is occupied, the controller may stop the host vehicle at a second reference location at which a rear side door of the host vehicle does not touch a previously parked vehicle even when the rear side door is opened. The controller may not stop the host vehicle at the second reference location when another vehicle approaching the host vehicle is detected. The second reference location may include a location closest to a location where the parking of the host vehicle is completed.

The controller may recommend the occupant exit the host vehicle when a width of the space for exiting the host vehicle does not exceed a reference value during an automatic parallel parking control.

When the occupant occupies a rear seat, the controller may stop a host vehicle at a third reference location at which a rear side door does not touch a previously parked vehicle even when the rear side door is opened. The controller may not stop the host vehicle at the third reference location when another vehicle approaching the host vehicle is detected. The third reference location may include a location closest to a location where the automatic parallel parking control of the host vehicle is completed.

The controller may recommend the passenger exit the host vehicle visually or visually at the third reference location.

According to another aspect of the present disclosure, a method of controlling automatic parking of a vehicle includes: measuring, by a sensor, a distance from a host vehicle to an obstacle during an automatic parking control; searching, by a controller, for a target parking space based on the measured distance; and recommending, by the controller, an occupant of the host vehicle exit the host vehicle based on an amount of space for exiting the host vehicle when the host vehicle is parked in the target parking space.

In one form, recommending the occupant exit the host vehicle may be performed when a width of the space for exiting the host vehicle in the target parking space does not exceed a reference value during an automatic perpendicular parking control.

The recommending the occupant exit the host vehicle may include: when a passenger seat of the host vehicle is occupied, stopping the host vehicle at a first reference location at which a passenger side door does not touch a previously parked vehicle even when the passenger side door is opened; recommending the occupant exit the host vehicle acoustically or visually at the first reference location; when a rear seat is occupied, stopping the host vehicle at a second reference location at which a rear side door does not touch the previously parked vehicle even when the rear side door is opened; and recommending the occupant exit the host vehicle acoustically or visually at the second reference location.

In one form, recommending the occupant exit the host vehicle may include not stopping the host vehicle at the first or second reference location when another vehicle approaching the host vehicle is detected.

The recommending the occupant exit the host vehicle may be performed when a width of the space for exiting the host vehicle does not exceed a reference value during an automatic parallel parking control.

In another form, recommending the occupant exit the host vehicle may include: when a rear seat is occupied, stopping the host vehicle at a third reference location at which a rear side door does not touch a previously parked vehicle even when the rear side door is opened, wherein the third reference location includes a location closest to a location where the host vehicle is parked; and recommending the occupant exit the host vehicle acoustically or visually at the third reference location.

The recommending the occupant exit the host vehicle may include not stopping the host vehicle at the third reference location when another vehicle approaching the host vehicle is detected.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
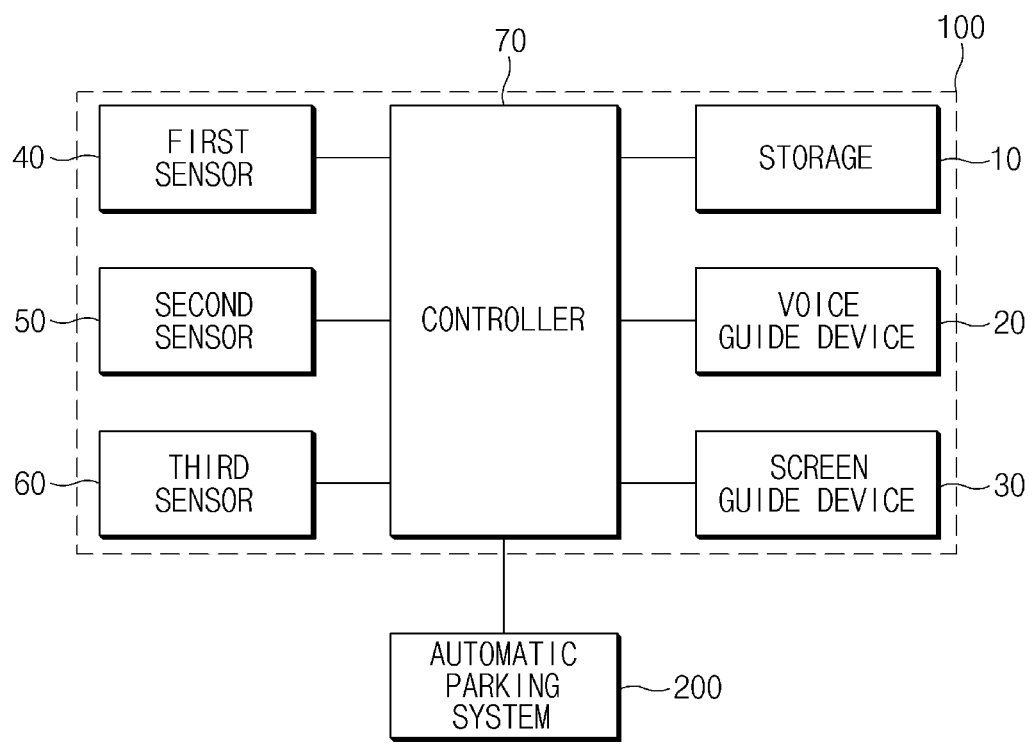
FIG. 1 is a block diagram illustrating an automatic parking control apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of well-known features or functions will be ruled out in order not to unnecessarily obscure the gist of the present disclosure.

In describing the components of the exemplary forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an automatic parking control apparatus according to one form of the present disclosure. Although FIG. 1 illustrates an example implemented separated from an automatic parking system 200, the automatic parking system 200 may be implemented to perform a function of an automatic parking control apparatus 100 according to one form of the present disclosure.

As illustrated in FIG. 1, the automatic parking control apparatus 100 may include: a storage 10, a voice guide device 20, a screen guide device 30, a first sensor 40, a second sensor 50, a third sensor 60, and a controller 70. In this case, according to a scheme of implementing the automatic parking control apparatus 100 according to one form of the present disclosure, each component may be combined with each other to be implemented as one, and some components may be omitted.

Regarding each component, first, the storage 10 may store various logic, algorithms and programs required in a process of recommending an occupant of a vehicle to exit the vehicle before automatic parking is completed based on a space for exiting the vehicle (e.g., a host vehicle) of the occupant during the automatic parking of the vehicle.

The storage 10 may store logic for determining whether the space for exiting the host vehicle in the target parking space is appropriate based on measured data from the first sensor 40.

The storage 10 may store logic for determining the location of the occupant in the vehicle based on the measured data from the second sensor 50, and determining the stop location of the vehicle in connection with the measured data from the first sensor 40.

The storage 10 may store logic for determining whether the occupant gets off based on the measured data from the second sensor 50 and the measured data from the third sensor 60.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The voice guide device 20, which is a module for acoustically inducing an occupant to get off, for example, may output voice guidance "Getting off space is narrow. Please get off now." The voice guide device 20 may be implemented with a speaker.

The screen guide device 30, which is a module for visually inducing an occupant to get off, for example, may output guidance text "Getting off space is narrow. Please get off now.", or an icon representing the guidance text. The screen guide device 30 may be implemented as a cluster, an audio video navigation (AVN) system, a head up display (HUD), and the like.

For example, the first sensor 40 may be implemented with an ultrasonic sensor, a radar, a lidar, and the like, and may be mounted on a vehicle to measure a distance and a location of an obstacle (e.g., another vehicle, or a wall). In this case, when the first sensor 40 is implemented with an ultrasonic sensor, the first sensor 40 may be mounted at the front/rear/left/right of a host vehicle.

The second sensor 50, which is a module for detecting the presence of the occupant in the vehicle as well as the location of the occupant in the vehicle, for example, may be implemented with an infrared sensor, a camera, a weight sensor mounted on a seat, or the like.

The third sensor 60 is a module mounted on each door of the vehicle to detect whether each door is opened or closed.

The controller 70 performs the overall control such that each component normally performs its function. The controller 70 may be implemented in hardware or software, or may be implemented in the form of a combination of hardware and software. In one form, the controller 70 may be implemented with a microprocessor, but is not limited thereto.

In particular, the controller 70 may perform various control required in the process of inducing or recommending an occupant to get off a vehicle (i.e., a host vehicle), before an automatic parking control is completed, based on the space for exiting the host vehicle for the occupant of the host vehicle 210 during the automatic parking control of the vehicle performed by various logic stored in the storage 10.

The controller 70 may induce the getting off of the occupant before the automatic parking control is completed based on the space for exiting the host vehicle for the occupant of the host vehicle 210 by interworking with the automatic parking system 200.

The controller 70 may determine whether the space for exiting the host vehicle in a target parking space is appropriate based on the data on the distance from a vehicle (i.e., a previously parked vehicle) to the host vehicle measured by the first sensor 40 in a parking space searching process. That is, the controller 70 may determine whether the space for exiting the host vehicle in the target parking space is sufficient or narrow. In this case, the target parking space means a parking space selected by a user.

Hereinafter, the process in which the controller 70 determines whether the space for exiting the host vehicle in the target parking space is appropriate will be described with reference to FIGS. 2 and 3.

Figure 2:
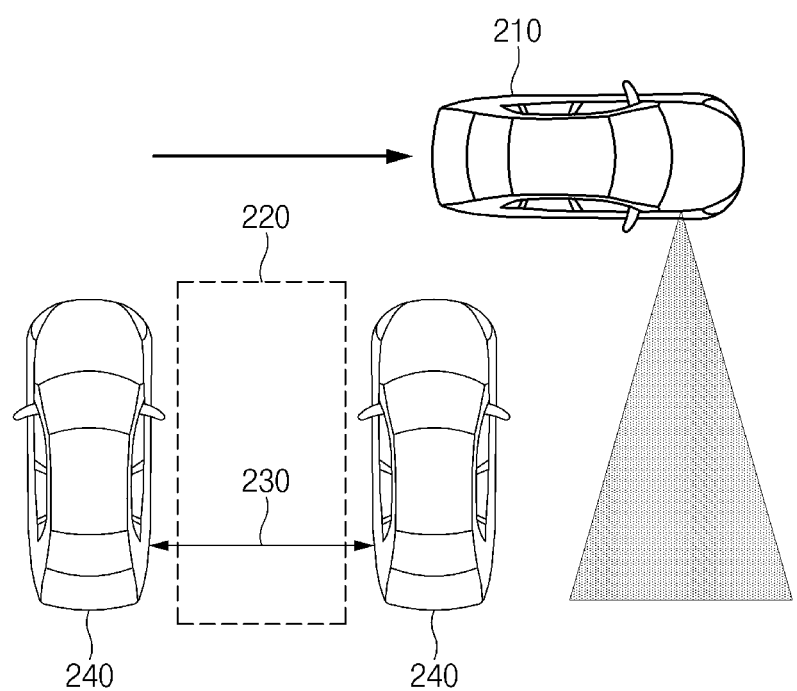
FIG. 2 is a view illustrating a process in which the controller provided in the automatic parking control apparatus determines whether a space for exiting a host vehicle in a target parking space is appropriate during an automatic perpendicular parking control.

FIG. 2 is a view illustrating a process in which the controller provided in the automatic parking control apparatus according to one form of the present disclosure determines whether the space for exiting the host vehicle in the target parking space is appropriate during the automatic perpendicular parking control.

As illustrated in FIG. 2, the controller 70 may identify a target parking space 230 based on the data on the distance from a vehicle 240 to a host vehicle 210 measured by the first sensor 40. In this case, the parking space 230 represents a width, reference numeral 220 represents a parking section.

Because the controller 70 knows the full width of a host vehicle 210, when the value obtained by subtracting the full width of the host vehicle from the parking space 230 and then dividing by two exceeds a reference value (e.g., 50 cm), the controller 70 may determine that the space for exiting the host vehicle is sufficient. If not, the controller 70 may determine that the space for exiting the host vehicle is narrow. In this case, when the controller 70 determines that the space for exiting the host vehicle for an occupant of the host vehicle is narrow, the controller 70 may recommend the occupant to exit the host vehicle through the voice guide device 20 and the screen guide device 30.

Figure 3:
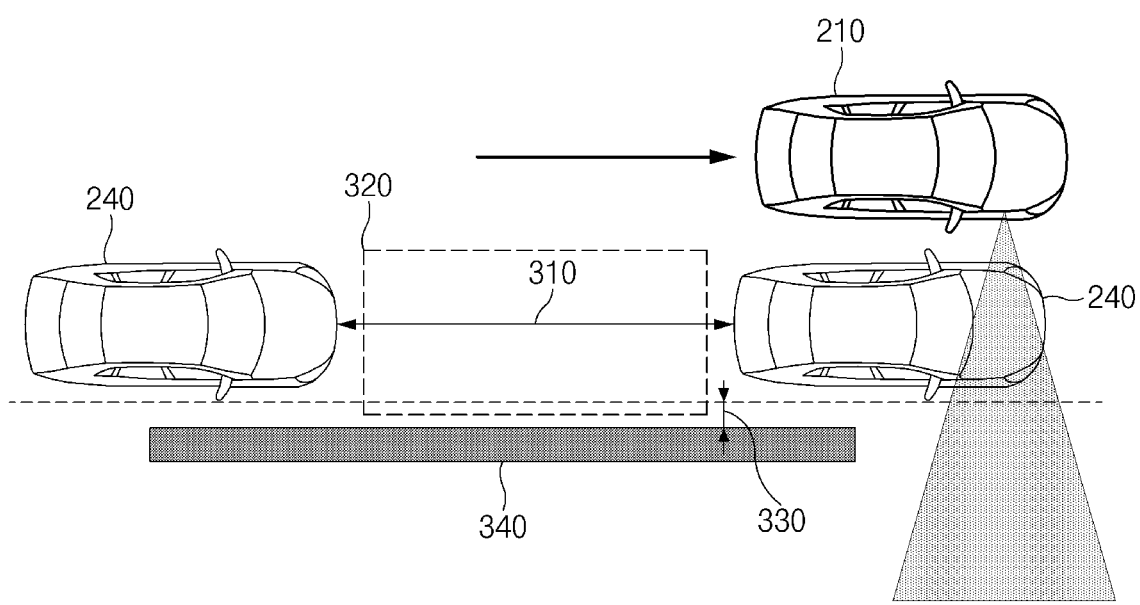
FIG. 3 is a view illustrating a process in which the controller provided in the automatic parking control apparatus determines whether the space for exiting the host vehicle in the target parking space is appropriate during an automatic parallel parking control.

FIG. 3 is a view illustrating a process in which the controller provided in the automatic parking control apparatus according to one form of the present disclosure determines whether the space for exiting the host vehicle in the target parking space is appropriate during an automatic parallel parking control.

As shown in FIG. 3, the controller 70 may calculate a space for exiting the host vehicle 330 based on the data on the distance from the host vehicle to an obstacle 340 measured by the first sensor 40. In this case, when it is assumed that the host vehicle 210 is parked in a parking section 320, the controller 70 may calculate the distance between the host vehicle 210 and the obstacle 340 as the space for exiting the host vehicle 330. In this case, the obstacle may be, for example, a wall. In addition, reference numeral 310 represents a parking space.

The controller 70 may determine that the space for exiting the host vehicle 330 is sufficient when the space for exiting the host vehicle 330 exceeds a reference value (e.g., 50 cm), otherwise the controller 70 may determine that the space for exiting the host vehicle 330 for the occupant is narrow. In this case, when the controller 70 determines that the space for exiting the host vehicle 330 for the occupant is narrow, the controller 70 may recommend the occupant of the host vehicle 210 to exit through the voice guide device 20 and the screen guide device 30.

Meanwhile, as shown in FIGS. 2 and 3, when the controller 70 determines that the space for exiting the host vehicle is narrow, the controller 70 may recommend the occupant to exit the host vehicle before the host vehicle 210 fully enters the target parking space. In this case, the controller 70 may recommend the occupant to exit the host vehicle when the occupant is detected in the host vehicle 210 by the second sensor 50.

Hereinafter, a process of determining a stop location of the host vehicle 210 by the controller 70 will be described with reference to FIGS. 4A to 5. In this case, the controller 70 may determine the stop location of the host vehicle 210 based on a location of the occupant inside the host vehicle detected by the second sensor 50.

Figure 4A:
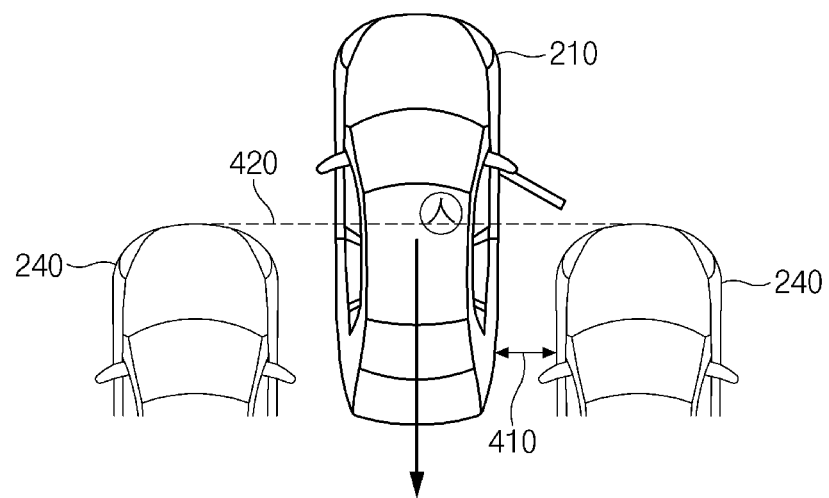
FIGS. 4A and 4B are views illustrating a process in which the controller provided in the automatic parking control apparatus determines a stop location of the host vehicle when the host vehicle is parked at a right angle.
Figure 4B:
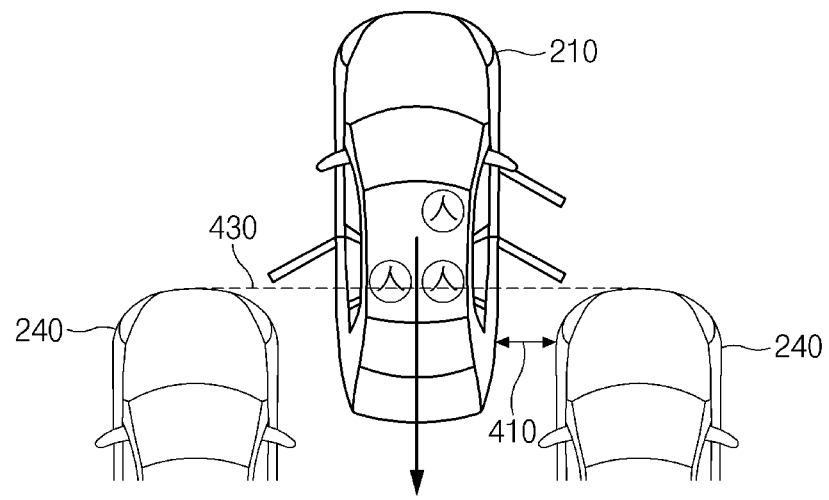

FIGS. 4A and 4B are views illustrating an automatic parking control by the controller provided in the automatic parking control apparatus according to one form of the present disclosure. The controller determines a stop location of the host vehicle when the host vehicle is parked at a right angle.

FIG. 4A illustrates a case where a space for exiting the host vehicle 410 for an occupant seated in the passenger seat of the host vehicle 210 does not exceed a reference value.

In the process of entering the target parking space 230, the controller 70 stops the host vehicle 210 when the host vehicle 210 arrives at a first reference location 420 where a passenger side door does not touch the vehicle 240 when the passenger side door is opened. In this case, the controller 70 may determine the first reference location 420 based on the distance between the host vehicle 210 and an already parked vehicle sensed by the first sensor 40 and information about the specification of the host vehicle 210 (e.g., the size of a door, the location of the door, the opening trajectory of the door, and the like). In this case, the first reference location 420 may be the location nearest to the location where the parking of the host vehicle 210 is completed.

When the host vehicle 210 reaches the first reference location 420, the controller 70 may induce the occupant to get off through the voice guide device 20 and the screen guide device 30. In this case, the controller 70 may determine whether the occupant gets off based on the detection data of the third sensor 60.

FIG. 4B illustrates a case where the space for exiting the host vehicle 410 for an occupant does not exceed the reference value in a state where occupants are seated in the passenger seat as well as rear seats of the host vehicle 210.

In the process of entering the target parking space 230, the controller 70 stops the host vehicle 210 when the host vehicle 210 arrives at a second location 430 where the rear side door of the host vehicle 210 does not touch the vehicle 240 even though the rear side door is opened. In this case, the controller 70 may determine the second reference location 430 based on the distance between the host vehicle and another vehicle 240 measured by the first sensor 40 and the information about the specification of the host vehicle 210. In this case, the second reference location 430 may be the location nearest to the location where the parking of the host vehicle 210 is completed.

When the host vehicle 210 reaches the second reference location 430, the controller 70 may induce the occupant to get off through the voice guide device 20 and the screen guide device 30. In this case, the controller 70 may determine whether the occupant gets off based on the detection data of the third sensor 60.

Figure 5:
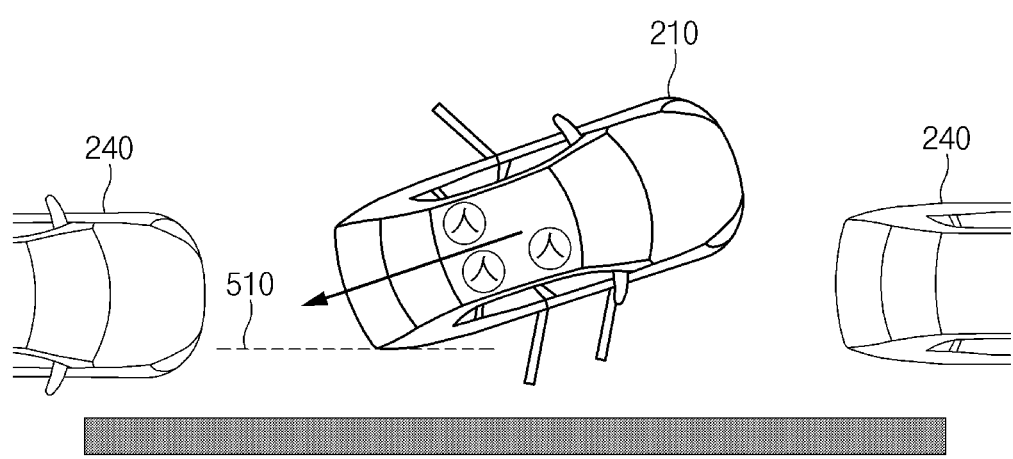
FIG. 5 is a view illustrating a process in which the controller provided in the automatic parking control apparatus determines the stop location of the host vehicle during the automatic parallel parking control.

FIG. 5 is a view illustrating a process in which the controller provided in the automatic parking control apparatus according to one form of the present disclosure determines the stop location of the host vehicle during the automatic parallel parking control. FIG. 5 illustrates a case where the space for exiting the host vehicle 330 for an occupant does not exceed the reference value in a state where occupants are seated in the passenger seat as well as rear seats of the host vehicle 210.

As shown in FIG. 5, in the process of entering the target parking space 310, the controller 70 stops the host vehicle 210 when the host vehicle 210 arrives at a third reference location 510 where the rear side door of the host vehicle 210 does not touch the vehicle 240 even though the rear side door is opened. In this case, the controller 70 may determine the third reference location 510 based on the distance data sensed by the first sensor 40 and the specification information of the host vehicle 210. In this case, the distance data may include data on the distance from the host vehicle to the vehicle 240 and data on the distance to the obstacle 340. In addition, the third reference location 510 may be the location nearest to the location where the parking of the host vehicle 210 is completed.

When the host vehicle 210 reaches the third reference location 510, the controller 70 may induce the occupant to get off through the voice guide device 20 and the screen guide device 30. In this case, the controller 70 may determine whether the occupant gets off based on the detection data of the third sensor 60.

Figure 6A:
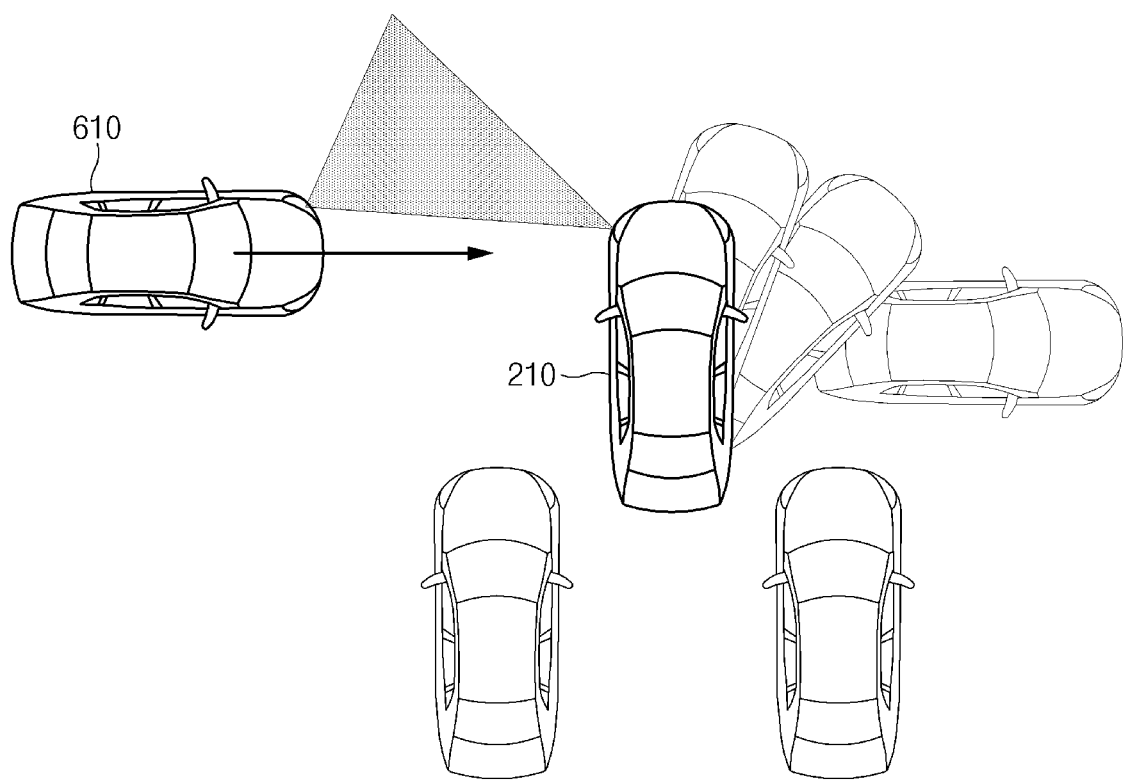
FIG. 6A is a view illustrating a process in which the controller provided in the automatic parking control apparatus determines a stop location of the host vehicle while the host vehicle is parked at a right angle.

FIG. 6A is a view illustrating a process in which the controller provided in the automatic parking control apparatus according to one form of the present disclosure determines a stop location of the host vehicle during the right angle parking.

As shown in FIG. 6A, even when the controller 70 determines that the space for exiting the host vehicle is narrow, when another vehicle 610 approaching the host vehicle 210 is detected through the first sensor 40, the controller 70 may not stop the host vehicle 210. That is, the controller 70 may not transmit a control signal for stopping the host vehicle 210 to the automatic parking system 200.

Figure 6B:
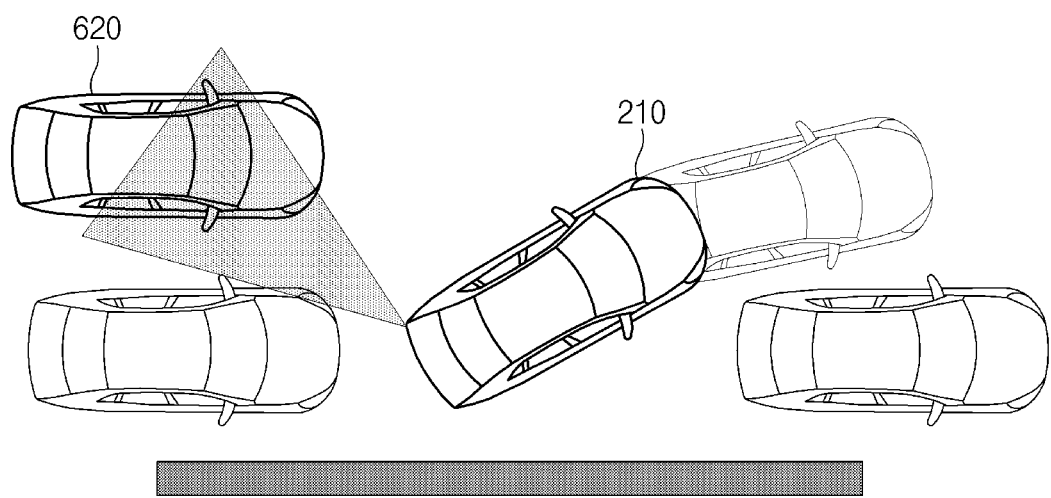
FIG. 6B is a view illustrating a process in which the controller provided in the automatic parking control apparatus determines a stop location of the host vehicle during the automatic parallel parking control.

FIG. 6B is a view illustrating a process in which the controller provided in the automatic parking control apparatus according to one form of the present disclosure determines a stop location of the host vehicle during the automatic parallel parking control.

As shown in FIG. 6B, even when the controller 70 determines that the space for exiting the host vehicle is narrow, when another vehicle 620 approaching the host vehicle 210 is detected through the first sensor 40, the controller 70 may not stop the host vehicle 210. That is, the controller 70 may not transmit a control signal for stopping the host vehicle 210 to the automatic parking system 200.

Figure 7:
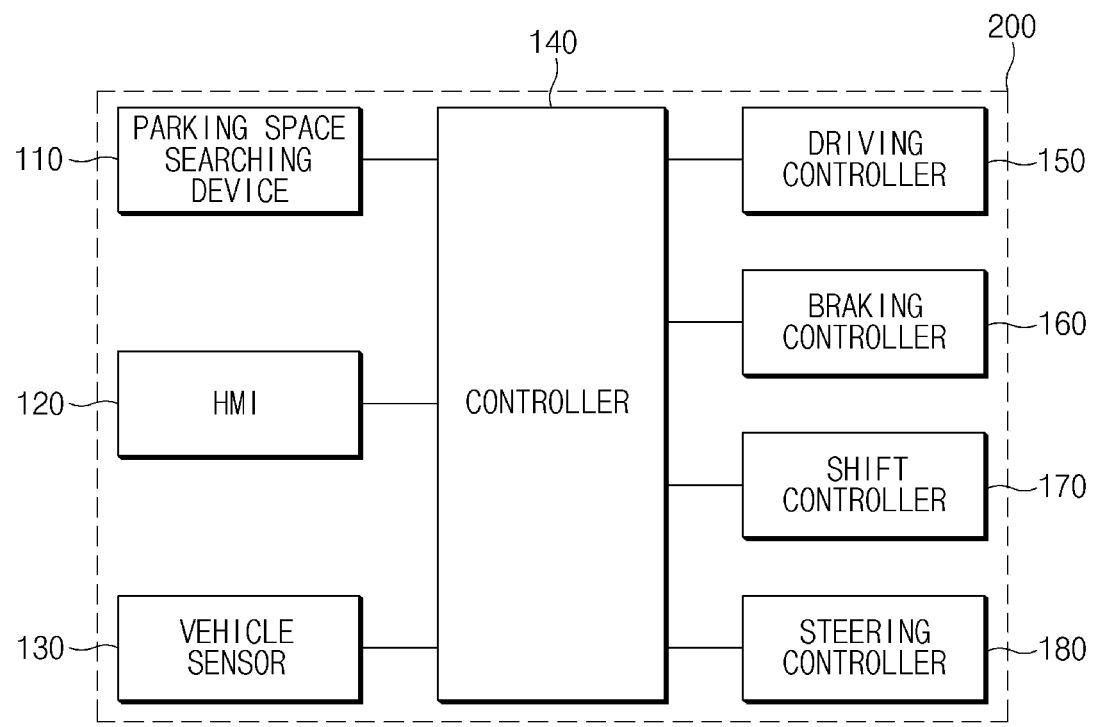
FIG. 7 is a block diagram of an automatic parking system interworking with an automatic parking control apparatus.

Meanwhile, the automatic parking system 200 interworking with the automatic parking control apparatus 100 according to one form of the present disclosure may perform a basic function related to the automatic parking of the host vehicle 210, where the configuration is shown in FIG. 7 as an example.

FIG. 7 is a block diagram of an automatic parking system interworking with an automatic parking control apparatus according to one form of the present disclosure.

As shown in FIG. 7, the automatic parking system 200 may include a parking space searching device 110, a human machine interface (HMI) 120, a vehicle sensor 130, a controller 140, a driving controller 150, a braking controller 160, a shift controller 170, a steering controller 180, and the like.

The parking space searching device 110 may search for a parking space and obtain the size and the surrounding environment information of the searched parking space. In this case, the surrounding environment information includes a nearby obstacle, the location of another parked vehicle, a distance from the obstacle, and the like.

The parking space searching device 110 may include an ultrasonic sensor, radar, lidar, and the like, one or more of which may be installed on the front, rear, right side, left side of the vehicle, respectively. The parking space searching device 110 may perform the function of the first sensor 40 instead.

The HMI 120, which is a module that provides an interface between the user and the automatic parking system, may include an input module and an output module. In this case, the input module may include a switch, a button, a keypad, and the like, and the output module may include a speaker, a cluster, a display, and the like. The HMI 120 may perform the functions of the voice guide device 20 and the screen guide device 30 instead.

The HMI 120 may transmit the input data according to a user operation to the controller 140, and output the progress and result according to the operation of the controller 140 in a form that the user can recognize.

The HMI 120 may generate a control command of instructing the automatic parking function execution (on) or release (off) according to the user operation. In addition, the HMI 120 may visually and audibly output information about an operation state of the vehicle and guide information for each parking step.

The vehicle sensor 130 may detect behavior information of the vehicle, including a vehicle speed, a steering angle, a wheel speed, whether a brake operates, whether an accelerator pedal operates, a position of a shift lever, and the like. The vehicle sensor 130 may include a vehicle speed sensor, a steering angle sensor, and the like.

The controller 140 is connected through a vehicle network to the parking space searching device 110, the HMI 120, the vehicle sensor 130, the driving controller 150, the braking controller 160, the shift controller 170, and the steering controller 180. In this case, the vehicle network may include a controller area network (CAN), a local interconnect network (LIN), a FlexRay, a media oriented systems transport (MOST), an Ethernet, and the like.

The controller 140 executes the automatic parking function when receiving a control command instructing activation of the automatic parking function through the HMI 120. For example, when the user turns on a parking switch, the controller 140 recognizes the fact through the HMI 120.

The controller 140 may select the parking space selected by the user from the parking space searched by the parking space searching device 110 as the target parking space. In addition, the controller 140 calculates a parking trajectory for parking the vehicle in the target parking space and sequentially generates one or more parking steps corresponding to the parking trajectory.

The controller 140 controls the driving controller 150, the braking controller 160, the shift controller 170 and the steering controller 180 to perform each parking step sequentially.

The driving controller 150 controls the engine drive to adjust the acceleration of the vehicle. The driving controller 150 may be implemented with an engine controller unit (ECU).

The braking controller 160 controls the deceleration of the vehicle. The braking controller 160 may be implemented with an electronic stability control (ESC).

The shift controller 170 serves to shift the gear (shift stage) of the vehicle. The shift controller 170 may be implemented with an electronic shift button (SBW).

The steering controller 180 controls the steering of the vehicle. The steering controller 180 may be implemented with motor drive power steering (MDPS).

Figure 8:
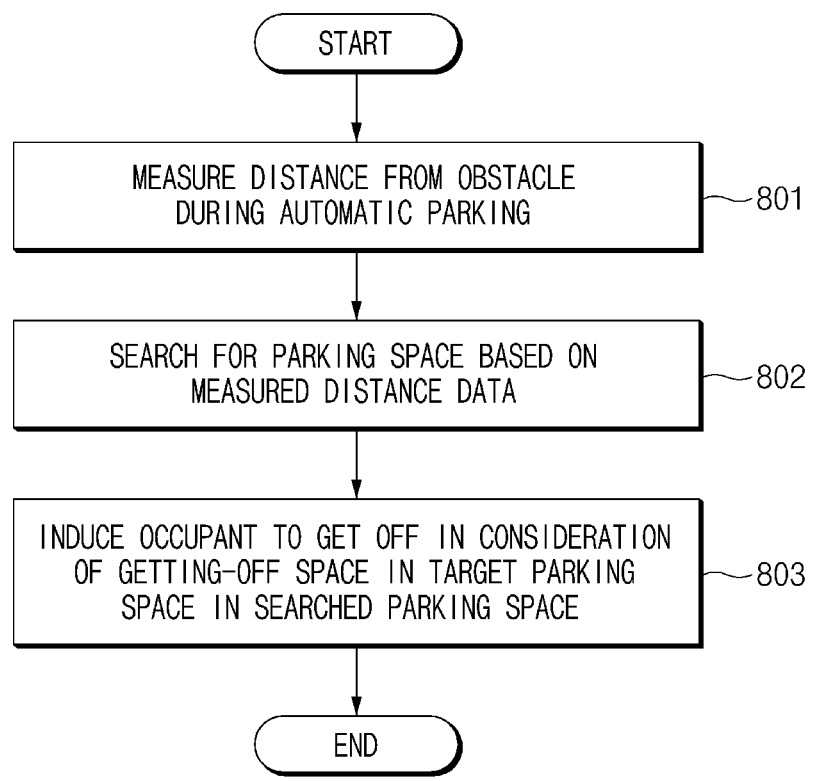
FIG. 8 is a flowchart illustrating an automatic parking control method.

FIG. 8 is a flowchart illustrating an automatic parking control method according to one foim of the present disclosure.

First, in operation 801, the first sensor 40 measures the distance from the obstacle (a vehicle, a wall, or the like) during automatic parking.

Thereafter, in operation 802, the controller 70 searches for a parking space based on the distance data measured by the first sensor 40.

Thereafter, in operation 803, the controller 70 induces an occupant to get off in consideration of the space for exiting the host vehicle in the target parking space among the searched parking spaces. In this case, when the width of the space for exiting the host vehicle in the target parking space does not exceed the reference value at right angle parking, the controller 70 may induce the getting off of the occupant and may determine the stop location of the host vehicle 210 corresponding to the boarding location of the occupant. For example, when the occupant is seated in the passenger seat, the host vehicle 210 is stopped at the first reference location where the passenger seat door does not touch a previous parked vehicle even when the passenger seat door is opened, and when the occupant is seated in the rear seat, the host vehicle 210 is stopped at the second reference location where the rear seat door does not touch the previously parked vehicle even when the rear seat door is opened. In this case, the first or second reference location 420 or 430 may be the location closest to the location where the parking of the host vehicle 210 is completed.

In addition, the controller 70 may induce the getting off of the occupant when the width of the space for exiting the host vehicle does not exceed the reference value during automatic parallel parking, and may determine the stop location of the host vehicle 210 corresponding to the boarding location of the occupant. For example, when the occupant is seated in the rear seat, the host vehicle 210 may be stopped at the third reference location 510 where the rear seat door does not touch the previously parked vehicle even when the rear seat door is opened. In this case, the third reference location 510 may be a location nearest to the location where the parking of the host vehicle 210 is completed.

Figure 9:
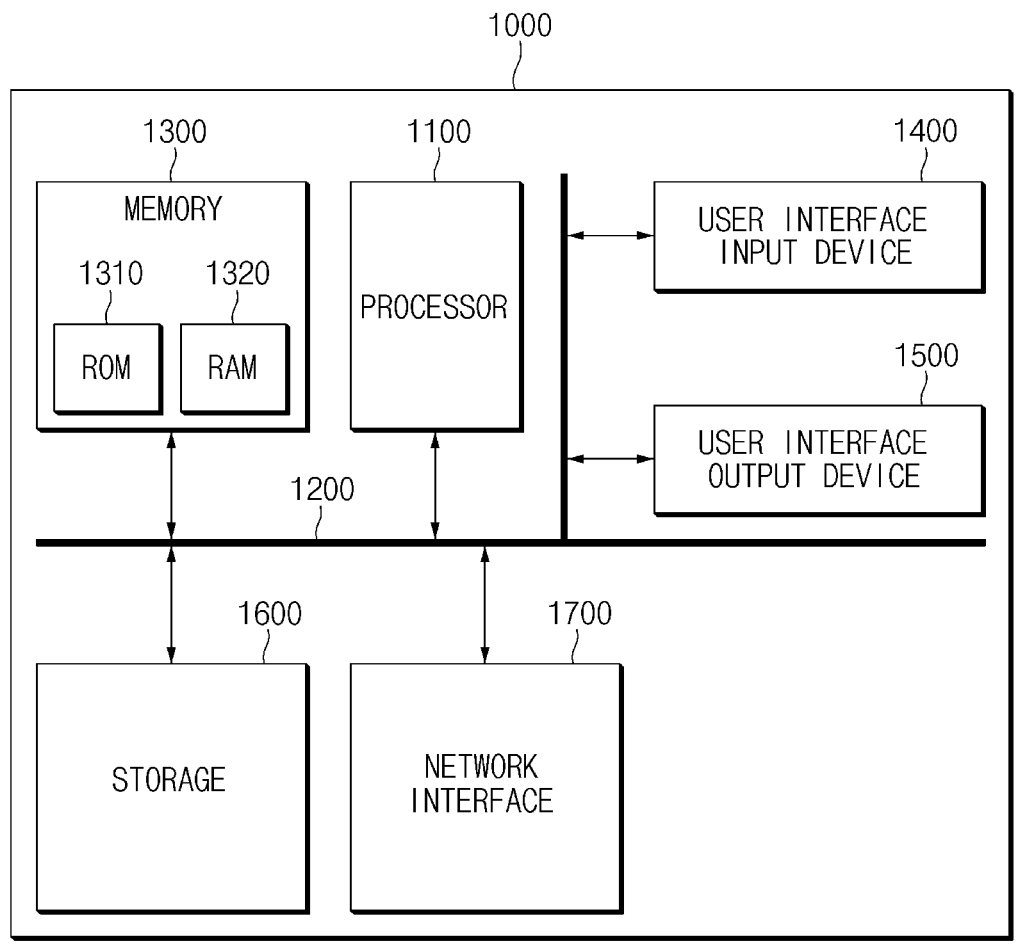
FIG. 9 is a block diagram illustrating a computing system for executing an automatic parking control method.

FIG. 9 is a block diagram illustrating a computing system for executing an automatic parking control method according to one form of the present disclosure.

Referring to FIG. 9, as described above, the automatic parking control method according to one form of the present disclosure may be implemented through a computing system. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the automatic parking control apparatus and the method thereof of one form of the present disclosure, by inducing the occupant to get off before the automatic parking is completed in consideration of the space for exiting the host vehicle for the occupant during the automatic parking of the vehicle, it is possible to improve the commercial value of the automatic parking system mounted on the vehicle without causing inconvenience to the occupant.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed forms of the present disclosure do not limit the technical spirit of the present disclosure but are illustrative, and the scope of the technical spirit of the present disclosure is not limited by the forms of the present disclosure. The scope of the present disclosure should be construed by the claims, and it will be understood that all the technical spirits within the equivalent range fall within the scope of the present disclosure.

What is claimed is:

1. An automatic parking control apparatus for a vehicle, the automatic parking control apparatus comprising:
 a first sensor configured to measure a distance from an obstacle to a host vehicle; and
 a controller configured to:
 search for a target parking space based on data on the distance measured by the first sensor,
 determine whether to recommend that an occupant of the host vehicle exit the host vehicle based on an amount of space for exiting the host vehicle when the host vehicle is parked in the target parking space, and
 not stop the host vehicle when another vehicle approaching the host vehicle is detected through the first sensor.

2. The automatic parking control apparatus of claim 1, wherein the controller is configured to recommend the occupant exit the host vehicle when a width of the space for exiting the host vehicle in the target parking space does not exceed a reference value during an automatic perpendicular parking control.

3. The automatic parking control apparatus of claim 2, wherein when a passenger seat of the host vehicle is occupied, the controller is configured to stop the host vehicle at a first reference location at which a passenger side door of the host vehicle does not touch a previously parked vehicle when the passenger side door is opened.

4. The automatic parking control apparatus of claim 3, wherein the first reference location includes a location closest to a location where the automatic perpendicular parking control of the host vehicle is completed.

5. The automatic parking control apparatus of claim 2, wherein when a rear seat of the host vehicle is occupied, the controller is configured to stop the host vehicle at a second reference location at which a rear side door of the host vehicle does not touch a previously parked vehicle when the rear side door is opened.

6. The automatic parking control apparatus of claim 5, wherein the second reference location includes a location closest to a location where the host vehicle is parked.

7. The automatic parking control apparatus of claim 5, wherein the controller is configured not to stop the host vehicle at the second reference location when another vehicle approaching the host vehicle is detected.

8. The automatic parking control apparatus of claim 1, wherein the controller is configured to recommend the occupant exit the host vehicle when a width of the space for exiting the host vehicle does not exceed a reference value during an automatic parallel parking control.

9. The automatic parking control apparatus of claim 8, wherein when a rear seat of the host vehicle is occupied, the controller is configured to stop a host vehicle at a third reference location at which a rear side door does not touch a previously parked vehicle when the rear side door is opened.

10. The automatic parking control apparatus of claim 9, wherein the third reference location includes a location closest to a location where the automatic parallel parking control of the host vehicle is completed.

11. The automatic parking control apparatus of claim 9, wherein the controller is configured not to stop the host vehicle at the third reference location when another vehicle approaching the host vehicle is detected.

12. A method of controlling automatic parking of a vehicle,
 the method comprising:
 measuring, by a sensor, a distance from a host vehicle to an obstacle during an automatic parking control;
 searching, by a controller, for a target parking space based on the measured distance;
 recommending, by the controller, an occupant of the host vehicle exit the host vehicle based on an amount of space for exiting the host vehicle when the host vehicle is parked in the target parking space; and
 determining, by the controller, whether another vehicle is approaching the host vehicle, and not stopping the host vehicle in response to the determining that the another vehicle is approaching the host vehicle.

13. The method of claim 12, wherein recommending the occupant exit the host vehicle is performed when a width of the space for exiting the host vehicle in the target parking space does not exceed a reference value during an automatic perpendicular parking control.

14. The method of claim 13, wherein recommending the getting off of the occupant includes:
 when a passenger seat of the host vehicle is occupied, stopping the host vehicle at a first reference location at which a passenger side door does not touch a previously parked vehicle even when the passenger side door is opened;
 recommending the occupant exit the host vehicle acoustically or visually at the first reference location;

when a rear seat is occupied, stopping the host vehicle at a second reference location at which a rear side door does not touch the previously parked vehicle even when the rear side door is opened; and recommending the occupant exit the host vehicle acoustically or visually at the second reference location.

15. The method of claim 12, wherein recommending the occupant exit the host vehicle includes:

recommending the occupant exit the host vehicle when a width of the space for exiting the host vehicle does not exceed a reference value during an automatic parallel parking control.

16. The method of claim 15, wherein recommending the occupant exit the host vehicle includes:

when a rear seat is occupied, stopping the host vehicle at a third reference location at which a rear side door does not touch a previously parked vehicle even when the rear side door is opened, wherein the third reference location includes a location closest to a location where the host vehicle is parked; and recommending the occupant exit the host vehicle acoustically or visually at the third reference location.

17. The method of claim 16, wherein recommending the occupant exit the host vehicle includes:

not stopping the host vehicle at the third reference location when another vehicle approaching the host vehicle is detected.

18. The method of claim 12, wherein:

recommending the occupant exit the host vehicle is performed when a width of the space for exiting the host vehicle when the host vehicle is parked in the target parking space does not exceed a reference value during an automatic parking control, and recommending the occupant exit the host vehicle includes:

when a seat of the host vehicle is occupied, stopping the host vehicle at a first reference location at which an occupied seat side door does not touch a parked vehicle even when the occupied seat side door is opened; and recommending the occupant exit the host vehicle acoustically or visually at the first reference location.

* * * * *